June 29, 1965   C. W. DEMYAN   3,191,630
GAS FLOW CONTROL SYSTEM FOR SUB-SONIC DIVERGENT DIFFUSERS
Filed April 11, 1963

INVENTOR.
CHARLES W. DEMYAN
BY *Stowell & Stowell*
ATTORNEYS 3,191,630
GAS FLOW CONTROL SYSTEM FOR SUB-SONIC
DIVERGENT DIFFUSERS
Charles W. Demyan, Somerville, N.J., assignor to
Research-Cottrell, Inc., Bridgewater Township,
N.J., a corporation of New Jersey
Filed Apr. 11, 1963, Ser. No. 272,431
2 Claims. (Cl. 138—42)

This invention relates to gas flow distributing means and, in particular, to gas flow distributing means for sub-sonic, wide angle divergent gas flow passages.

A divergent or expanding gas flow passage, unlike a convergent gas flow passage, has been found to produce an adverse pressure gradient on gases passing therethrough. The adverse pressure gradient is brought about by the flow of gas from a region of low pressure to a region of increased pressure. The difference in pressure, which increases as the included angle of the divergent passage increases, causes the gas flow adjacent the boundary layer to stagnate and separate from the wall of the gas flow passage. The separation at the boundary layer is generally small in passages having small angles of divergency while the separation may be violent in wide angle divergent passages. Conventional boundary layer control means such as vortex generators, suction slots and the like, provide satisfactory flow control, satisfactory conversion of kinetic energy to static pressure and a normal velocity profile when the divergent gas flow passage has small included angles up to, for example, 10°.

Where wide angle divergent passages are necessary, conventional flow control means are not effective to prevent the formation of large fully developed, transitory or fixed stalls which form adjacent the surfaces of the divergent gas flow passages.

It is a principal object of the present invention to provide a relatively simple and practical method of achieving optimum gas velocity distribution in a wide angle sub-sonic divergent passage.

A further object is to provide gas flow control means which may be effectively utilized to control gas flow in wide angle divergent, conical and rectangular diffusers.

These and other objects and advantages are provided in a divergent passage for sub-sonic gas flow having gas flow control means comprising a series of perforated plates mounted in the divergent passage with the flat faces thereof positioned generally normal to flow of gas in the passage, wherein the first of the series of plates is positioned adjacent the downstream end of the divergent passage and wherein each preceding plate of the series is positioned from about 15 to about 20 times the maximum perforation size upstream of its adjacent downstream plate.

The invention will be more particularly described with reference to the accompanying drawings wherein.

Figure 1:
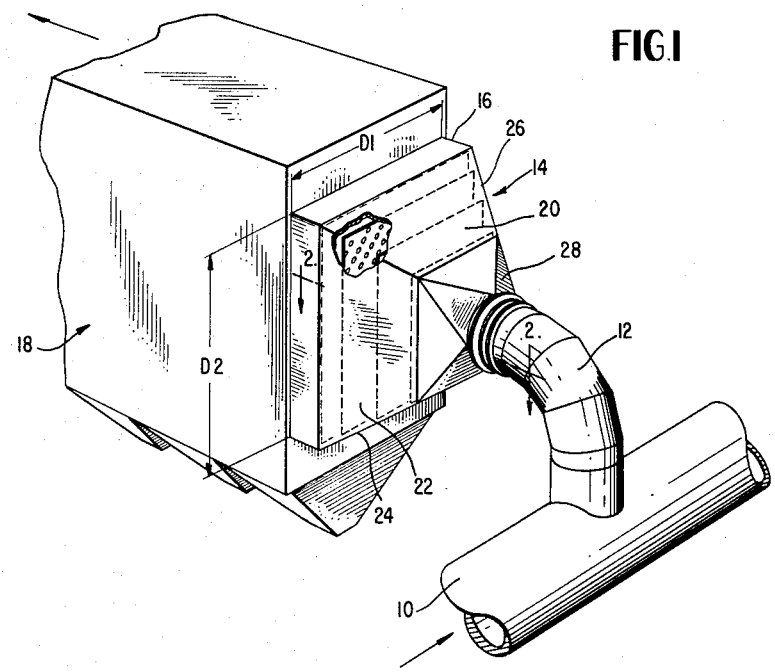
FIG. 1 is a perspective view of a gas flow system including the improved gas flow distributing means of the invention.
Figure 2:
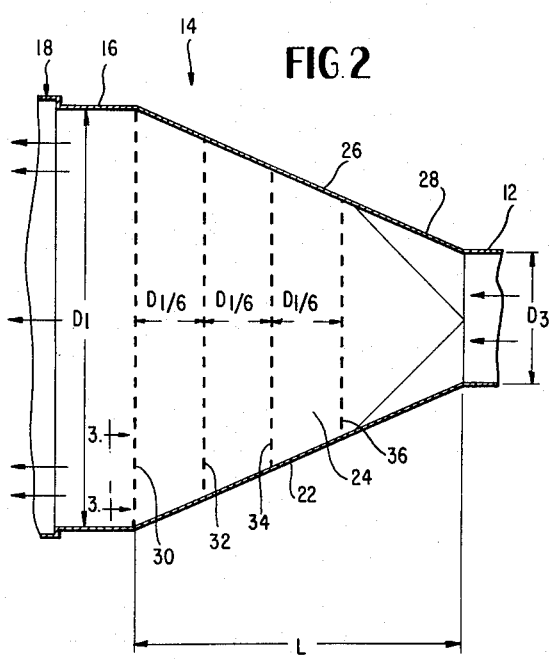
FIG. 2 is an enlarged fragmentary sectional view substantially on line 2—2 of FIG. 1.

Referring to FIG. 1 of the drawings, illustrating a typical installation employing the gas flow control system of the invention, 10 designates a primary gas manifold which may comprise the offtake flue from one or more furnaces. A portion of the gas flowing in the manifold 10 is withdrawn through an offtake pipe 12 which directs the gas into a divergent diffuser 14 having its wide end 16 connected to the inlet end of a gas cleaning device 18 such as an electrostatic precipitator.

In order to provide for efficient cleaning of the high velocity gases flowing through offtake pipe 12, it is necessary to decrease the velocity of the gas and to provide relatively uniform distribution of the gas through the gas cleaning apparatus 18. The reduction in the gas velocity and the uniform distribution of the gas at the inlet end to the gas cleaning apparatus 18 is provided in the divergent diffuser 14.

In the illustrated form of the invention, the divergent diffuser 14 is rectangular in shape and has walls 20, 22, 24 and 26 which slipe outward from the upstream inlet end of the coupling 28 to the wide outlet end 16 of the diffuser. As hereinbefore discussed, an adverse pressure gradient results from the gas flow from the region of low pressure adjacent the outlet from the offtake duct 12 to the region of maximum pressure adjacent the outlet end 16 from the divergent diffuser 14. The difference in pressure between the inlet and the outlet end of the diffuser 14 normally causes the gas flow adjacent the boundary layer to stagnate and separate from the walls 20, 22, 24 and 26 of the diffuser which separation results in a non-uniform gas distribution at the outlet end of the diffuser.

Uniform distribution of gas at the downstream outlet end 16 of the diffuser and non-turbulent expansion of the gas in the diffuser 14 is accomplished by mounting in the diffuser 14 a series of perforated plates generally designated 30, 32, 34 and 36. The plates are mounted with their flat faces generally normal to the desired direction of gas flow through the diffuser. The first in the series of the preforated plates 30 is positioned at the widest portion of the diffuser and each of the preceding perforated plates of the series 32, 34 and 36 is positioned from about 15 to about 20 and, preferably, about 18 times the maximum size of the perforations in the plate upstream of its adjacent downstream plate. As will be discussed hereinafter the size of the perforations is based on the dimensions of the diffuser; thus the number of plates is determined by the configuration of the diffuser.

Figure 3:
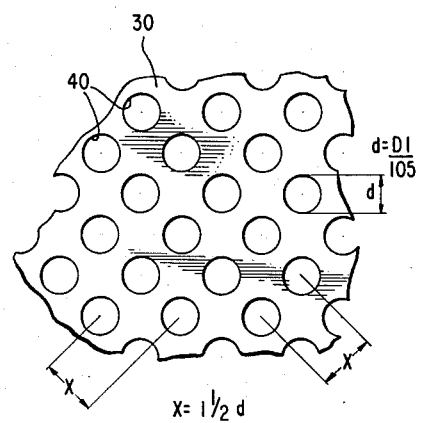
FIG. 3 is an enlarged fragmentary view of one of the gas distribution plates substantially on line 3—3 of FIG. 2.

Referring particularly to FIG. 3, perforated plate 30 is provided with a plurality of openings 40 which openings are preferably circular in form as circular openings have been found to be most satisfactory as they eliminate any possibilities of corner effects normally associated with square, triangular, or the like configurations.

The ratio of perforation dimension to the minimum or minor diffuser outlet dimension is 1 to from about 80 to about 130 and preferably 105. In the preferred form of the invention, the perforations 40 are placed in offset or staggered rows to provide optimum gas expansion by permitting the gas to expand freely through the mixing zone in the region behind each of the plates. The staggered arrangement of the rows of perforations also presents structurally the strongest configuration for the perforated plates. The distance between centers of the openings X are 1½ diameters of the openings which provides 50% plate solidity; however, satisfactory results are achievable with from about 30 to about 60% open plate area; i.e., a solidity ratio of 0.4 to 0.7. As the plate solidity ratio exceeds 0.5 instability of the gas flow increases substantially.

While in the illustrated form of the invention, the gas distribution members comprise perforated plates, the gas distribution members may comprise woven or formed wires, bars, ribbons and the like; therefore, throughout the specification and in the claims, the term "perforated plates" means a sheet having a plurality of openings extending from face to face thereof and includes a sheet member having openings punched or cast therein or a generally planar surface member consisting of woven or formed wires, bars, ribbons and the like.

Example

In an installation where the diameter $D_3$ of the offtake pipe 12 is 6 feet, a wide angle diffuser of rectangular shape was inserted between the end of the offtake pipe and the opening into an electrostatic precipitator. The diffuser had an overall expanding section length L of about 13 feet and the major dimension $D_2$ at the downstream outlet end of the expansion zone was 21 feet, 6 inches, and the minimum or minor dimension $D_1$ at the downstream outlet end was about 19 feet. Four perforated plates were positioned along the axis of the diffuser with each plate serially spaced about ⅙ the minor dimension $D_1$ or about 3 feet beginning at the downstream end of the diffuser. Each of the plates had 50% solidity and the perforations in each of the plates were in staggered horizontal rows and were about 2½ inches in diameter. The openings in the plates were spaced 3.75 inches on center.

With a gas velocity of about 3600 feet per minute in the offtake duct 12, expansion through the diffuser was relatively non-turbulent and the gas distribution at the outlet end of the diffuser was substantially uniform.

From the foregoing description of the present invention, it will be seen that the flow distributing means for wide angle sub-sonic diffusers is relatively simple in form and relatively inexpensive to fabricate and install. While, in the illustrated form of the invention, the diffuser is illustrated as being quadrangular in cross-section, the principles of the invention also apply to diffusers which are cylindrical in cross-section.

I claim:

1. In a divergent passage for sub-sonic gas flow, gas flow control means comprising a series of flat perforated plates of thin cross-section compared to the transverse dimensions of said passage, said plates being non-buckling during gas flow and mounted in the divergent passage with the flat faces thereof positioned generally normal to the flow of gas in the passage, the perforations in each of the plates being discrete, circular in cross-section and of a uniform diameter, and comprising from about 30 to about 60% of the area of each of said plates, the ratio of the perforation diameter to the minimum dimension of the outlet end of the divergent passage being 1 to from about 80 to about 130, the first of said series of plates being positioned at the downstream end of the divergent passage, and each preceding plate of the series being spaced upstream of its adjacent downstream plate at a distance from about 15 to about 20 times the diameter of the perforations in the plates.

2. In a divergent passage for sub-sonic gas flow, gas flow control means comprising a series of flat perforated plates of thin cross-section compared to the transverse dimensions of said passage, said plates being non-buckling during gas flow and mounted in the divergent passage with the flat faces thereof positioned generally normal to the flow of gas in the passage, each of the perforated plates having discrete circular openings therein comprising about 50% of the area of each of the plates, the ratio of the perforation diameter to the minor dimension of the outlet end of the divergent passage being 1 to about 105, the first of said series of plates being positioned at the downstream end of the divergent passage, and each preceding plate of the series being spaced upstream of its adjacent downstream plate at a distance about 18 times the diameter of the plate perforations.

References Cited by the Examiner

UNITED STATES PATENTS

| | | | |
|---|---|---|---|
| 1,914,072 | 6/33 | Boylston | 181—69 |
| 2,987,136 | 6/61 | Lilley et al. | 181—69 |

EDWARD V. BENHAM, *Primary Examiner.*

LEWIS J. LENNY, *Examiner.*